US004001555B2

United States Statutory Invention Registration [19]

[11] Reg. Number: H1555

[45] Published: Jul. 2, 1996

Kargilis

[54] PISTON TOP DEAD CENTER LOCATING TOOL

[75] Inventor: John S. Kargilis, Birmingham, Mich.

[73] Assignee: Chrysler Corporation, Auburn Hills, Mich.

[21] Appl. No.: 148,947

[22] Filed: Nov. 8, 1993

[51] Int. Cl.[6] ..... G01M 17/007

[52] U.S. Cl. ..... 73/116; 33/600

[58] Field of Search ..... 33/601, 600, 602, 33/603, 604, 605, 606, 610, 542.1; 73/116

[56] References Cited

U.S. PATENT DOCUMENTS

| | | | |
|---|---|---|---|
| 1,184,154 | 5/1916 | Wilesmith | 33/611 |
| 1,611,062 | 5/1925 | Peebles | 33/605 |
| 1,737,726 | 4/1927 | Muzyn | 33/601 |
| 1,782,142 | 2/1929 | Havens | 33/601 |
| 2,112,917 | 5/1936 | Linn | 33/600 |
| 2,426,955 | 9/1947 | Stroup | 33/600 |
| 2,471,746 | 5/1949 | Hilbert | 33/601 |
| 3,852,887 | 12/1974 | Hennrick | 33/601 |
| 3,889,528 | 6/1975 | Grikscheit et al. | 73/119 R |
| 4,531,295 | 7/1985 | Saathoff | 33/601 |

*Primary Examiner*—Bernarr E. Gregory
*Attorney, Agent, or Firm*—Kenneth H. MacLean, Jr.

[57] ABSTRACT

A tool for visually indicating the relative crankshaft and piston position at top dead center for an internal combustion engine of the type having a threaded opening for a spark plug positioned above the piston's top surface. The tool consists of a base which has threads for attachment in the spark plug opening, an outer tubular member supported by the base to allow it to slide upward through the base in response to urging of the top of the piston moving toward the base but otherwise being frictionally secured to the base, and an inner member equal in the length dimension to the outer member and supported by the outer member in a manner allowing it to initially move upward with the outer tubular member as urged by the piston but also allowing it to move with the piston away from the base and the outer member whereby changes in the alignment of the exterior ends of the members indicates piston movement past top dead center.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PISTON TOP DEAD CENTER LOCATING TOOL

BACKGROUND OF THE INVENTION

1. Field of the Invention

This invention relates to an apparatus or assembly for use in finding and indicating the top dead center position of a piston in an internal combustion engine.

2. Description of Related Art

There are several devices known to find and indicate the top dead center position of a piston in an engine. The subject device accomplishes this purpose and is simpler, easier to use, and less costly than previously know devices.

In U.S. Pat. No. 1,184,154 issued to Wilesmith, a device to indicate a pistons's position is disclosed which uses a movable rod 1 supported in a housing with a graduated face 2. The exterior end of the rod is visible relative to the graduated face to indicate relative piston location. Similar devices are disclosed in U.S. Pat. Nos. 1,782,142 and 2,426,955 issued to Havens and to Stroup respectively.

In U.S. Pat. No. 1,737,726 issued to Muzyn, a device to indicate a piston's position for the purpose of checking valve timing is disclosed which uses a tubular gauge rod or calibrated tube 10 movable in a housing 1. A rod 16 is threadably supported in the tube 10. Once set for a top or bottom dead center piston position, both the tube 10 and rod 16 move together.

SUMMARY OF THE INVENTION

This invention is directed to a new and improved device for providing a visual indication of a piston's position and the corresponding crankshaft position when the piston is at top dead center. The device is particularly devised for an internal combustion engine of the type having a threaded opening for a spark plug which is located above and in-line with a top surface of a piston. The device consists of a base which has threads for attachment in the spark plug opening, an outer tubular member supported by the base to allow it to slide upwardly through the base in response to upward piston movement toward the base but otherwise being frictionally secured within the base, and an inner member equal in the length dimension to the outer member and supported by the outer member in a manner allowing it to initially move upward with the outer tubular member as urged by the piston but also allowing it to move downwardly with the piston away from the base and the outer member whereby changes in the alignment of the exterior ends of the members indicates piston movement past top dead center.

An advantage and an object of the subject device is to provide a simple to use but accurate tool for determining the top dead center position of a piston in an internal combustion engine.

Other features and advantages will become more apparent from the following:

DETAILED DESCRIPTION

Figure 1:
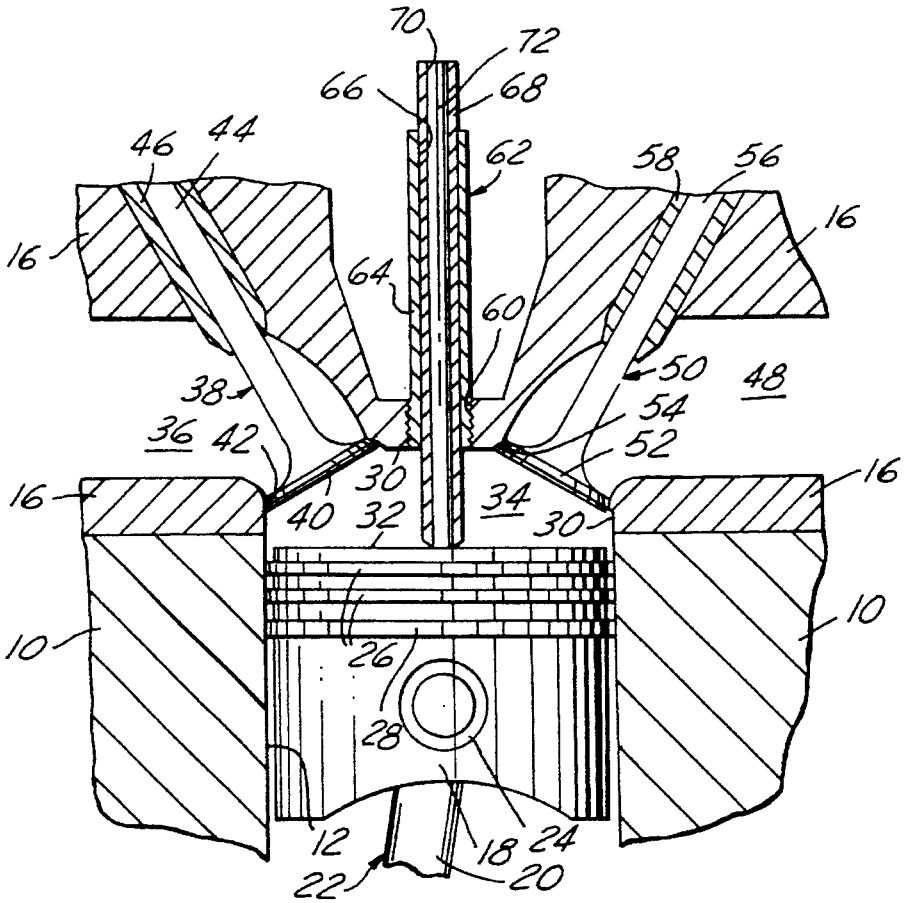
FIG. 1 is a partial elevational sectioned view of an engine combustion chamber with a piston at the top dead center position and with the subject locating tool.

Turning now in greater detail to the drawings and particularly FIG. 1 in which an embodiment of the invention as illustrated, a portion of an engine block 10 is shown which defines a cylinder 12. The upper end or deck surface of the engine block as well as the cylinder is covered by a cylinder head 16. The cylinder head 16 is attached to the engine block by a plurality of fasteners (not shown) in a conventional manner. A piston 18 is supported within cylinder 12 in a manner permitting reciprocal movements as is well known in the engine art. Piston 18 is attached to an upper end portion 20 of a connecting rod 22 by a piston pin 24. The lower end portion (not shown) of the connecting rod 22 is attached to an engine crankshaft (not shown) in a manner well know in the engine art.

Piston 18 includes piston rings 26 and an oil control ring 28 which slide against the surface of cylinder 12. The cylinder 12, surfaces 30 of the cylinder head 16, and the top surface 32 of piston 18 define a variable volume combustion chamber 34. An air/fuel mixture is passed into the combustion chamber 34 through an intake passage 36. The flow of air/fuel is controlled by opening and closing of an intake valve 38. Valve 38 has an enlarged valve head 40 which is shown seated against a valve seat 42 in the closed operative position. A stem portion 44 of the intake valve 38 is supported in the cylinder head 16 by a valve guide 46 which permits an axially downward movements of the valve 38 to a more opened operative position.

After combustion of the air/fuel mixture in the combustion chamber 34, the exhaust products are discharged through an exhaust passage 48 in the cylinder head. The flow of exhaust products from the combustion chamber 34 is controlled by opening and closing of an outlet or exhaust valve 50. Exhaust valve 50 has an enlarged valve head 52 which is shown seated against a valve seat 54 in the closed operative position. A stem portion 56 of the exhaust valve 50 is supported in the cylinder head 16 by a valve guide 58 which permits an axially downward movements of the valve 50 to a more opened operative position.

The engine illustrated in FIG. 1 is of a common type in which a threaded spark plug aperture 60 is provided above the top surface 32 of the piston 18. Instead of a spark plug, aperture 60 is utilized to mount the subject piston position locating tool assembly 62 when the location of the top dead center position of the piston and crankshaft is desired. Specifically, position locating tool 62 includes base or mount housing 64 with a threaded lower end adapted and configured to be screwed into aperture 60 of cylinder head 16. The base 64 has an internal bore 66 into which a tubular outer member 68 is supported. In turn, an internal bore 70 of outer member 68 supports an inner member 72.

The base 64 of the locating tool assembly 62 supports the outer member 68 to permit axial movement of the member 68 relative to base 64. However, the dimension of bore 66 and member 68 are configured to create a sufficiently tight sliding fit so that friction restrains axial movement and thus a small but significant axial force is needed to slide outer member 68 in bore 66. In contrast, the bore 70 and inner member 72 are configured so that there is not a substantial force caused by friction to restrain relative axial movements between members 68 and 72.

Figure 2:
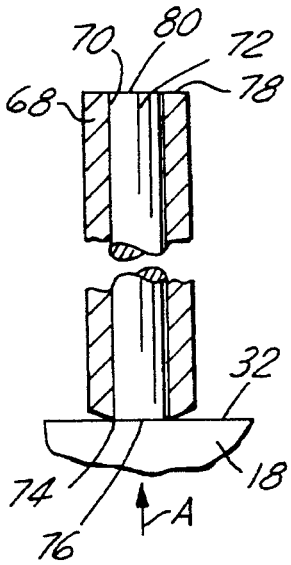
FIG. 2 is an enlarged elevational view of a portion of the piston just as it attains its top dead center position and showing the lower and upper portions of the subject locating tool.

As shown in FIG. 2, the lower end portion of outer member 68 is beveled so as to present an inner edge portion 74 which is contacted by top surface 32 of the piston 18 as the piston moves upward in direction A toward its top dead center position. The lower end portion of inner member 72 is formed with a flat surface 76 which is also contacted by the top surface 32 of piston 18. When the piston is moving upward in direction A, both outer and inner members 68, 72 are forced upward through bore 66 of base 64.

Figure 3:
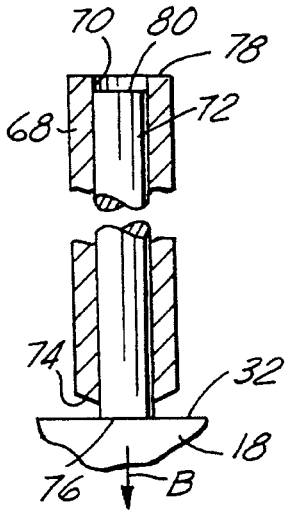
FIG. 3 is an enlarged elevational view of a portion of the piston after it passes its top dead center position and showing the lower and upper portions of the subject locating tool.

The outer and inner members 68, 72 are exactly equal in length so that during this upward piston movement, the upper end surfaces 78 and 80 of members 68 and 72 are aligned or flush with one another which is easily determined by visual examination as well as by touch. This aligned relationship of end surfaces 78, 80 continues until the piston 18 passes its top dead center position and begins to move downward in cylinder 12. The downward movement is indicated in FIG. 3 by arrow B.

When the piston 18 begins to move downward in direction B, there is no longer a significant axial force exerted by piston 18 on outer member 68 and therefore a frictional force between member 68 and base 64 retains member 68 in its uppermost axial position. Unlike member 68, the inner member is free of significant friction between it and outer member 68 so that inner member follows top surface 32 of piston 18 in its downward movement. This produces an ever increasing non-alignment between end surfaces 78 and 80 which is both immediately visible and immediately detectable by touch.

Thus, the subject piston position locating tool assembly readily and simply indicates by visual examination or by touch a crankshaft position at which a particular piston has attained its top dead center position. While a preferred embodiment of the invention has been shown and described, other embodiments will now become apparent to those skilled in the art. Accordingly, this invention is not to be limited to what is shown and described but by the following claims.

What is claimed is:

1. For an internal combustion engine having an axially aligned cylinder and spark plug aperture in a cylinder head, a top dead center position indicator for a piston in the cylinder, comprising: a base member with a threaded end portion adapted to be attached to the engine within the spark plug aperture to provide a stationary support, said base member having a bore therethrough with an axis generally aligned with the axis of the cylinder; a tubular outer member extending through said bore in said base member; an inner member supported within said tubular outer member, said inner member being capable of reciprocal movements within said outer member; said outer member being sized relative to said bore in said base member to permit reciprocal movement of said outer member relative to said base member only in response to a significant axially applied force upon the outer member, as by upward movements of the piston toward the base member; said inner member being sized relative to said tubular outer member to permit free reciprocal movements within said outer member; said tubular outer member and said inner member having exactly the same length dimension so that as the ends nearest the piston of said outer and inner members are contacted by a piston as it moves in the cylinder toward said base member, the opposite externally exposed end surfaces of both members are arranged to form a common unbroken plane and subsequently as the piston moves oppositely away from the base member, only the inner member follows the movement of the piston thereby producing a visual axial dislocation of said end surfaces to visually present the ends in two different planes.

2. A piston position indicating tool for revealing the top dead center position of a piston in a combustion chamber of an internal combustion engine of the type having a cylinder bore and a cylinder head with a threaded spark plug opening, the spark plug opening and the cylinder being generally axially aligned with direction of travel taken by a piston in the cylinder, comprising: a base member having an end portion with external thread means configured and sized to attach into the spark plug opening for temporarily attachment to the engine, said base member having a bore therethrough with its axis extending generally parallel to the movement of the piston in the cylinder; a tubular outer member extending through said bore in said base member and defining an interior end portion adapted to project into the combustion chamber of the associated engine and having an opposite exterior end portion; an inner member supported by and extending through said tubular outer member, said inner member having an interior end portion within the combustion chamber of the associated engine and having an opposite exterior end portion; said outer member being sized and configured relative to said bore in said base member to permit axial movement of said outer member relative to said base member only in response to a significant axially applied force upon said outer member such as by upward movement of the piston toward said base member; said inner member being sized and configured relative to said supporting tubular outer member to freely allow axial movement relative to said outer member and said base member without significant axially applied forces other than gravitational force; said tubular outer member and said inner member having equal lengths so that when the interior ends of both members are engaged by a piston moving upward toward said base member, said opposite external ends of both members are arranged to form a common unbroken plane but when the piston moves past its top dead center position and withdraws from said base member, said outer member retains its uppermost position relative to the base member while the inner member follows the piston's downward movement thereby producing an axial dislocation of said external end surfaces to visually present the outer and inner ends in two different planes.

3. The piston position indicating tool as set forth in claim 2 in which the internal end portion of said outer member is furnished with a beveled end configuration so as to contact the top surface of an associated piston immediately adjacent the end surface of the inner member.

* * * * *